July 4, 1944.  A. P. GRUENKE ET AL  2,352,706
WAFFLE IRON
Filed May 23, 1941
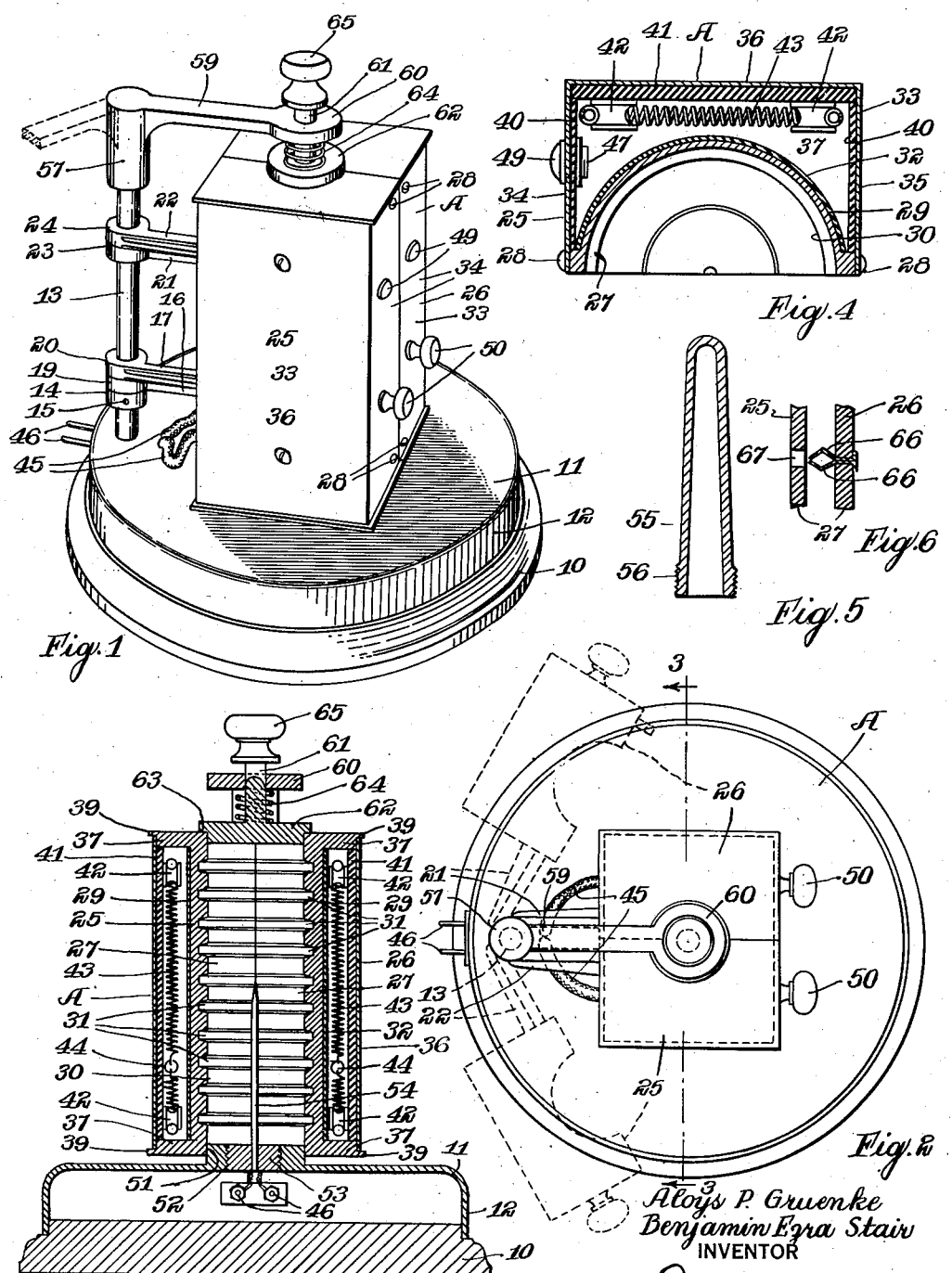

Patented July 4, 1944

2,352,706

UNITED STATES PATENT OFFICE 2,352,706

WAFFLE IRON

Aloys P. Gruenke, St. Paul, Minn., and Benjamin Ezra Stair, Sioux Falls, S. Dak.

Application May 23, 1941, Serial No. 394,856

8 Claims. (Cl. 99—381)

Our invention relates to an improvement in a waffle iron, wherein it is desired to provide a device for cooking waffles enclosing a meat product, or the like.

Waffles are oftentimes eaten with other materials, such as sausage, bacon, or other materials, and have in some instances been combined with materials such as cheese. While such food products have been previously produced, the method of producing the same has not been entirely satisfactory for all purposes. In the first place, these food products have usually been formed in a two part waffle iron, one portion of which extends horizontally to permit the waffle dough to be poured therein. This lower iron section is usually filled with batter which may surround the food product to be enclosed. The upper section of the iron must then be closed over the lower section and the dough or batter must expand sufficiently to extend entirely around the food product. This has been difficult to accomplish. When the waffle iron is hot, as it should be in cooking such materials, the operator is scarcely given time to pour the batter in place and close the iron before the dough has an opportunity of spreading over the flat surface of the lower section of the iron, surrounding the concave aperture into which it is poured. Obviously if the batter spreads laterally over the adjoining abutting surface of the lower section of the mold, the two portions of the mold can not close tightly together and the batter will not expand and enclose the food product. As these previous methods of operation took considerable time, it was extremely difficult to produce satisfactory waffles on the previously constructed waffle iron designed to enclose a food product within the waffle batter.

It is the object of the present invention to provide a waffle iron which will avoid previous difficulties in the formation of a waffle of the class described. This waffle iron comprises a vertical mold which includes a support for a food product, such as sausage or the like. In forming the waffle it is only necessary to pour the batter into the mold at the top thereof, filling the mold to the proper level. Any expansion of the batter which takes place, then acts in a vertical direction to somewhat elongate the waffle, rather than to improperly enclose the same. As a result the food product is always effectively enclosed and the only variation between the waffles might be a slight difference in the length of the same.

A feature of the present invention resides in a waffle iron having two pivotally mounted mold sections which pivot along a substantially vertical axis and abut on a substantially vertical plane. A permanent closure may provide the lower end of the mold, while a resiliently urged or weighted plunger may close the upper end of the mold. With such a construction the batter may be poured into the mold from one end thereof, and at the same time the cooked product may readily be removed from the iron by swinging the two parts of the mold about the vertical axis.

A feature of the present invention resides in the supporting means for the cooked product. The sausage or other food product to be enclosed in the waffle batter may be impaled upon a supporting prong located in fixed position at one end of the mold and the batter may be poured in through the other end of the mold to surround this food product. At the end of the cooking operation the enclosed food product is entirely concealed, with the exception that a small opening is provided at one end thereof due to the impaling prong.

A further feature of the present invention resides in the provision of a waffle iron, the body of which is formed in two parts and supported so that these parts may be separated. These two mold sections are combined with a spring urged or weighted plunger which closes the inlet opening to the mold. Thus after the batter has been poured into the mold the inlet opening is closed by means of a plunger which may be slidably moved by the pressure of the expanding waffle batter. In case an excess of this batter is provided, the plunger will slide more readily than the two sections of the mold may separate, thereby preventing any danger of the body of the mold separating accidentally. At the same time, any excess of batter is effectively accommodated.

An added feature of our invention lies in the provision of a waffle iron which may be mounted in unity, each of which may be individually operable so that a number of waffles may be simultaneously made, if each of the units should be individually operated, but a single unit is disclosed herein.

A further feature of the present invention resides in the provision of a waffle iron of two parts separable along a vertical line of operation, and in the provision of a closure for an end of the mold which may be swung or moved out of the opening to permit the batter to be readily placed into the mold. It would be difficult to fill the mold if the plunger were not movably mounted to move away from the top of the iron, and by so constructing the waffle iron, we provide an iron which may be readily filled.

A further feature of the present invention resides in the provision of a removable impaling prong, which may be substituted in the mold device to permit a cavity to be formed in the waffle, which may be filled at the end of the cooking operation. As a result, if it is desired to provide a waffle which may be filled with some material, which preferably is not heated with the waffle, such a waffle may be formed and filled at the completion of the molding operation.

An additional feature of our invention resides in the provision of a waffle which may be used to enclose a food product of any desirable type, which could be used in combination with the waffle. The impaling prong may be used to support any product, which by its nature is capable of being supported on such a prong, and through the provision of a cavity forming device, other types of food products may be placed into the waffle after the completion of the cooking operation.

These and other objects and novel features of our invention will be more clearly and fully set forth in the following specification and claims.

In the drawing forming a part of our specification:

Figure 1 is a perspective view of a waffle iron constructed in accordance with the principles of our invention.

Figure 2 is a top plan view of the waffle iron illustrated in Figure 1, showing the two sections of the mold in open position in dotted outline.

Figure 3 is a vertical cross sectional view through the waffle iron, the position of the section being indicated by the line 3—3 of Figure 2.

Figure 4 is a transverse section through one section of the mold, illustrating the construction thereof.

Figure 5 is a vertical section through the cavity forming device, which may be substituted for the impaling prong illustrated in Figure 3 of the drawing.

Figure 6 is a sectional view through the locking device for holding the sections of the mold in interlocked relation.

The waffle iron A includes a base 10, including a top covering plate 11 having depending side walls 12 mounted thereupon. The plate 11 provides a smooth upper surface which may be readily cleaned, and which preferably will not discolor or stain.

A pivot post or standard 13 extends upwardly from the base 10, as best illustrated in Figure 1 of the drawing. A collar 14 is secured on the post or standard 13 in any suitable manner, as by a set screw 15. A pair of pivot arms 16 and 17 are provided with enlarged bearing portions 19 and 20 which rest upon each other and upon the collar 14. A second set of pivot arms 21 and 22 are provided with bearing portions 23 and 24 which encircle the post 13 and pivotally support the arms 21 and 22.

The waffle iron A includes two body sections, indicated in general by the numerals 25 and 26. The sections 25 and 26 are similar in construction. The section 25 is pivotally supported by the arms 17 and 22. The section 26 is pivotally supported by the post 13, by the arms 16 and 21. The collar 14 holds the two sections at the proper elevation with respect to the base 10.

The sections 25 and 26 each include a semitubular mold section 27, which in the form illustrated is provided with a semicylindrical outer surface 29 and a concentric semicylindrical inner surface 30. The inner surface 30 is provided with a series of grooves 31 in spaced relation within the same, which grooves are designed to form rings about the body of the waffle cast therein.

Encircling the outer surface 29 of the mold 27, we provide a thin sheet 32 of asbestos, or other insulating material, to prevent short circuit between the metal body of the waffle iron and the heating element which will be later described. A channel-shaped outer covering 33 is secured by screws or bolts 28, or any other suitable means to the mold sections 27. These channel-shaped coverings 33 enclose the entire outer surface of the mold sections 27 and are preferably formed of stainless steel, or of plated metal, in order to present an attractive appearance. As will be noted in Figure 1 of the drawing, when the waffle iron is closed, the molds are entirely concealed between the ends by the channel-shaped coverings 33. These coverings 33 have opposed front and rear walls 34 and 35 and a side wall 36.

The mold sections 27 are cast with substantially rectangular end flanges 37 which terminate in marginal flanges 39. The channel covering members 33 encircle the rectangular flanges 37 and are supported in rectangular shape thereby. The marginal flanges 39 extend beyond the surface of the coverings 33 to form a flange at each end of the waffle iron.

Mounted along the walls 34 and 35 of the channel-shaped covering 33, we provide sheets 40 of asbestos, or other suitable heat insulating means. Along the base of the channels 33, which form the sides of the mold, we provide a heavier sheet 41 of asbestos, or other heat insulating material. To this sheet 41 we secure a series of spaced insulators 42, about which may be wound the heating element 43. The ends of the heating element 43 are shown in Figure 3 of the drawing to be connected at 44 to the current supply wires 45, which extend into the base and which are connected to prongs 46 which may be connected to any suitable supply of electrical current.

Extending through the front wall 34 of each of the channel-shaped covering members 33, we provide a tubular element 47 which is closed at its outer extremity by means of a transparent or translucent lens 49. When the heating element 43 is being supplied with current the light given off by this heating element is readily visible through the lenses 49. Somewhat beneath the lenses 49 we provide operating knobs 50 by means of which the two sections of the mold may be separated.

Upon the base plate 11 we provide a central boss 51 which is centrally drilled and threaded at 52. A plug 53 threadably engages in the boss 51 and is provided with an impaling prong 54 thereupon. This impaling prong is designed to support meat, such as a cooked sausage, or the like, to be enclosed within batter poured through the top of the mold. The boss 51 fits closely within the cylindrical bore 30 of the mold sections 27, preventing the leaking of batter therebetween.

The shape of the impaling prong 54 is not essentially as it is pictured in Figure 3 of the drawing. Various types of impaling devices or cavity forming devices may be used in place of the prong 54 illustrated. In Figure 5 of the drawing we disclose a cone 55 which is provided with a threaded end 56 to threadably engage the threads 52 of the boss 51. Such a cone may be substituted for the plug 53 and impaling prong 54, if it is so desired. Obviously the cone 55 forms a cavity in the waffle which may be filled at the completion of the cooking operation.

In order to close the upper end of the mold we provide a socket 57 which engages the upper end of the standard 13 and which is provided with a bracket 59 which supports the bearing 60. A plunger 61 extends through the bearing 60 and terminates in a plug 62 designed to fit into the upper end of the mold cavity within the cylindrical bore 30. A flange 63 at the top of the plug 62 provides a means of limiting the downward movement of this plug. A spring 64 encircles the plunger 61 to urge the plunger 62 downwardly. An operating knob 65 secured to the upper end of the plunger 61 limits the downward movement of the plunger when the mold is open, or when the top has been swung to one side as illustrated in dotted outline in Figure 1 of the drawing.

A pair of springs 66 are mounted to extend from one of the sections 26 and is designed to extend into a suitable aperture 67 in the section 25. As the mold closes the springs 66 compress together and engage in the aperture 67 to hold the mold sections 25 and 26 in closed position. These springs 66 will also compress to permit the two sections to be swung into open position, as illustrated in dotted outline in Figure 2 of the drawing, when it is desired to do so. However, they are of sufficient strength to prevent accidental opening of the mold.

The manner of operation of the mold is believed obvious from the foregoing description. The two sections 25 and 26 of the mold are swung into closed position, as illustrated in Figure 1 of the drawing, and the top plunger 62 is removed by pulling upwardly on the knob 65 and swinging the bracket 59 to one side, as illustrated in dotted outline in Figure 1 of the drawing. The entire top end of the mold is then opened for filling purposes. Previous to closing the two sections of the mold, a food product, such as a cooked sausage or the like, may be impaled upon the prong 54 and supported, spaced from the edges of the mold so that it may be entirely enclosed by the waffle batter.

When the mold is filled to the desired level the bracket 59 is swung around above the opening at the top of the mold and the plunger 62 is dropped into the upper end of the mold cavity. If an excess of waffle batter has been inserted the spring 64 will flex sufficiently to allow the plunger 62 to raise to accommodate for this excess. After a certain desired period of cooking the two sections of the mold may be spread apart and the plunger 62 moved from its closing position. The waffle having the food product embedded therein may then be removed by lifting the same vertically, the prong 54 sliding out through the lower end of the waffle.

We have described a unit which is operable as a unit, and which includes but a single mold cavity. Our same principle of invention can be applied to multiple units having the same theory of operation as has been described. In the case of multiple units it is in some instances desirable to have the mold sections mounted for slidable movement as they separate and move together, as the pivotal movement disclosed requires more space than otherwise would be necessary. Such multiple devices, however, would operate on much the same principle as has been described herein, and for this reason a detailed explanation is believed unnecessary.

In accordance with the patent statutes, we have described the principles of construction and operation of our waffle iron, and while we have endeavored to set forth the best embodiments thereof, we desire to have it understood that obvious changes may be made within the scope of the following claims without departing from the spirit of our invention.

We claim:

1. A waffle iron comprising a pair of sections designed to separate along a substantially vertical plane, a mold cavity formed by said sections between the same, said sections having a filling opening in communication with said mold cavity, and spring urged yielding means for closing said filling opening and to allow for expansion of the waffle.

2. A waffle iron comprising two sections separable along a substantially vertical plane, a mold cavity formed by said sections and between the same, a filling opening in communication with said mold cavity, means for closing said filling opening, spring urged means for yieldably supporting said closing means to allow for expansion of the waffle, and means within said cavity for supporting a food product to be enclosed by the waffle batter.

3. A waffle iron comprising a horizontal base, a boss projecting upwardly from said base, a pair of vertical waffle iron sections, means on said base mounting said sections for movement toward and away from said projecting boss on said base while maintaining the vertical position thereof, said projecting boss forming the bottom of the mold cavity between sections in closed position thereof, means for closing the upper extremity of the mold cavity, and spring urged yieldable means resiliently urging said last named closing means into closing position, said closing means allowing for expansion of the waffle.

4. A waffle iron comprising a horizontal base, a boss projecting upwardly from said base, an impaling prong projecting upwardly from said projecting boss, a pair of waffle iron sections separable along a substantially vertical plane, means mounting said sections movable while in vertical position toward and away from said projecting boss on said base in their entirety, said sections having a mold cavity therebetween, said sections engageable about said projecting boss in closed position of said sections, said projecting boss forming a bottom for the mold cavity, and means closing the top of said mold cavity.

5. A waffle iron comprising a base, a projecting boss extending upwardly from said base, an impaling prong projecting upwardly from said projecting boss, a pair of waffle iron sections separable along a substantially vertical plane, means for mounting said sections for movement toward and away from said projecting boss on said base, a mold cavity formed between said sections, said projecting boss forming a bottom for said mold cavity in closed position of said sections, and a yieldably supported closing means for the upper end of said mold cavity arranged to allow expansion of the waffle.

6. A waffle iron comprising a pair of waffle iron sections separable along a substantially vertical plane, means for mounting said sections for movement toward and away from one another, said sections having a mold cavity therebetween and having a filling opening in communication with said mold cavity, a reciprocable plunger closing said inlet opening, and means for swingably supporting said reciprocable plunger so that said plunger may be moved into or out of axial alignment with said filling opening.

7. A waffle iron comprising a pair of waffle iron sections separable along a substantially vertical plane, means for mounting said sections for movement toward and away from one another, said sections having a molded cavity therebetween in closed position and having a filling opening in communication with said mold cavity, a plunger for closing said filling opening, a means for urging said plunger resiliently into said filling opening and a means for swingably mounting said plunger out of alignment with said filling opening.

8. A waffle iron comprising a base, a standard projecting upwardly from said base, a pair of mold sections pivotally secured to said standard to separate along a substantially vertical plane, said mold sections having a mold cavity therebetween in closed position, a filling opening in communication with said mold cavity, and yieldable means for closing said filling opening, said yieldable means mounted in said standard to yield upon expansion of the waffle.

ALOYS P. GRUENKE.
BENJAMIN EZRA STAIR.